United States Patent
Suryanarayanan et al.

(10) Patent No.: US 7,177,453 B2
(45) Date of Patent: Feb. 13, 2007

(54) METHOD AND APPARATUS FOR PARTITIONING A VOLUME

(75) Inventors: Srikanth Suryanarayanan, Bangalore (IN); Rakesh Mullick, Bangalore (IN); Vidya Pundalik Kamath, Bangalore (IN); Yogisha Mallya, Bangalore (IN); Robert F. Senzig, Germantown, WI (US)

(73) Assignee: General Electric Company, Niskayuna, NY (US)

( * ) Notice: Subject to any disclaimer, the term of this patent is extended or adjusted under 35 U.S.C. 154(b) by 749 days.

(21) Appl. No.: 10/304,581

(22) Filed: Nov. 26, 2002

(65) Prior Publication Data

US 2004/0101179 A1    May 27, 2004

(51) Int. Cl.
*G06K 9/00* (2006.01)
(52) U.S. Cl. ................................ 382/128; 600/425
(58) Field of Classification Search ........ 382/128, 382/129, 130, 131, 132, 133, 134, 164, 171, 382/173, 177, 179; 600/14, 425, 516, 407; 128/922; 378/4, 20–28, 901, 8
See application file for complete search history.

(56) References Cited

U.S. PATENT DOCUMENTS

| 5,570,404 | A |   | 10/1996 | Liang et al. | ............ | 378/8 |
| 5,657,369 | A | * | 8/1997 | Stein et al. | ............ | 378/208 |
| 5,782,762 | A | * | 7/1998 | Vining | ............ | 600/407 |
| 5,832,134 | A | * | 11/1998 | Avinash et al. | ............ | 382/257 |
| 5,835,562 | A | * | 11/1998 | Ramsdell et al. | ........... | 378/206 |
| 6,393,090 | B1 | * | 5/2002 | Hsieh et al. | ............ | 378/4 |

OTHER PUBLICATIONS

Henk W. Venema, et al, CT Angiography of the Circle of Willis and Intracranial Internal Carotid Arteries: Maimum Intensity Projection with Matched Mask Bone Elimination—Feasibility Study; Radiology. 2001;218:893-898; RSNA, 2001.

Changjiang Yan et al., Extraction of Blood Vessel in CT Angiography Image Aided by Fuzzy Logic; Proceedings of ICSP2000; pp. 926-929; 2000 IEEE.

Alyssin & Avinash, Semi-Automatic Bone Removal Technique from CT Angiography Data; GE Research & Development Center; GE Medical Systems.

Carl-Fredrik Westin et al., Using Local 3D Structure for Segmentation of Bone from Computer Tomography Images; pp. 794-800; 1997 IEEE.

(Continued)

*Primary Examiner*—Jingge Wu
*Assistant Examiner*—Abolfazl Tabatabai
(74) *Attorney, Agent, or Firm*—Fletcher Yoder (57) ABSTRACT

A technique is provided for partitioning an imaged volume into two or more sub-volumes. The technique identifies partition lines which separate the sub-volumes by generating a profile, such as a bone profile, which is then analyzed to determine the placement of the partition lines. In one embodiment, placement of the partition lines is determined automatically by applying one or more sets of hierarchical rules to the profile. After separation of the imaged volume into sub-volumes, each sub-volume may be differentially segmented such that segmentation is customized for the sub-volume. Likewise, after separation of the imaged volume into sub-volumes, the acquisition parameters for each sub-volume may be customized for subsequent acquisitions.

54 Claims, 7 Drawing Sheets

OTHER PUBLICATIONS

C-F Westin et al., Tensor Controlled Local Structure Enhancement of CT Images for Bone Segmentation; http://splweb.bwh.harvard.edu:8000/pages/papers/westin/miccai98/miccai98html.html.

Gunter Bohm et al., Three-Dimensional Segmentation of Bone Structures in CT Images; SPIE 3661: 0277-786X/99, 1999.

Punam K. Saha et al., Automatic Bone-Free Rendering of Cerebral Aneurysms Via 3D-CTA; Proc. SPIE vol. 4322:1264-1272; 2001.

* cited by examiner

METHOD AND APPARATUS FOR PARTITIONING A VOLUME

BACKGROUND OF THE INVENTION

The present invention relates generally to the field of medical imaging and particularly to the field of volumetric medical imaging. Specifically, the invention relates to a technique for partitioning an imaged volume into sub-volumes, which may each be processed according to their anatomical landscape.

Volumetric medical imaging technologies use a variety of techniques to gather three-dimensional information about the body. For example, Computed Tomography (CT) imaging system measure the attenuation of X-ray beams passed through a patient from numerous angles. Based upon these measurements, a computer is able to reconstruct images of the portions of a patient's body responsible for the radiation attenuation. As will be appreciated by those skilled in the art, these images are based upon separate examination of a series of angularly displaced cross sections. It should be pointed out that a CT system produces data that represent the distribution of linear attenuation coefficients of the scanned object. The data are then reconstructed to produce an image which is typically displayed on a cathode ray tube, and may be printed or reproduced on film.

Likewise, Magnetic Resonance Imaging (MRI) systems are ubiquitous in the field of volumetric medical imaging. In general, MRI examinations are based on the interactions among a primary magnetic field, a radiofrequency (rf) magnetic field and time varying magnetic gradient fields with nuclear spins within the subject of interest. Specific nuclear components, such as hydrogen nuclei in water molecules, have characteristic behaviors in response to external magnetic fields. The precession of spins of such nuclear components can be influenced by manipulation of the fields to obtain rf signals that can be detected, processed, and used to reconstruct a useful image.

Similarly Positron Emission Tomography (PET) and other volumetric imaging technologies are useful for producing useful diagnostic renderings. One factor which can impair the usefulness of these volumetric imaging technologies, however, is the relative difficulty in discerning a structure of interest against an anatomical background with similar texture or contrast.

In particular, volumetric medical imaging technologies often rely on some form of automated segmentation to selectively extract an object from its background. However, segmentation algorithms which are designed for a large part of the human body or for the entire human body often perform poorly within local anatomical regions of complex anatomy. In particular, such segmentation algorithms are generally not optimized for local anatomical landscapes but are instead designed to accommodate wide anatomical variations. As a result, in regions where the anatomical landscape is distinctive, such algorithms may perform poorly. Instead, it may be desirable to employ customized algorithms within localized anatomical regions to obtain optimal processing within those regions.

Likewise, image acquisition, particularly where multiple acquisition events occur, may also benefit from customizing acquisition for localized anatomical variations. For example, anatomical regions which display little variability to a particular imaging modality may be scanned at a lower resolution or with thicker slices, thereby decreasing the acquisition time as well as the amount of data which must be generated and analyzed. Likewise, the region of interest or anatomically complex regions may benefit from increased resolution or thinner slices which yield greater data for analysis.

There is a need therefore, for a technique for automatically partitioning volumetric images into anatomically distinct sub-volumes which may then be differentially processed or acquired.

BRIEF DESCRIPTION OF THE INVENTION

The present technique provides a novel approach to automatically partition an imaged volume into two or more sub-volumes based upon anatomical characterization of the sub-volumes. Partitioning may be accomplished by identifying transition boundaries which demarcate sub-volumes characterized by different anatomical landscapes. After partitioning, the processing of the sub-volumes may be customized for their respective anatomical landscape, such as by the use of segmentation algorithms optimized for that sub-volume. In addition, identification of the sub-volumes may be used to adapt subsequent image acquisitions.

In accordance with one aspect of the technique, a method is provided for processing volume image data. The aspect provides for analyzing a set of image data. One or more partition lines are identified in the set of image data. Each partition line separates two sub-volumes within a volume. The volume is partitioned into sub-volumes as determined by the one or more partition lines.

In accordance with another aspect of the technique, a medical imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array and a computer operably connected to the system controller and to memory circuitry. An operator workstation is operably connected to the computer and at least one of a printer and a display is connected to the operator workstation. At least one of the system controller and the computer is configured to analyze a set of image data representative of an imaging volume and to identify one or more partition lines in the set of image data. The at least one of the system controller and the computer is further configured to partition the imaging volume into sub-volumes as determined by the one or more partition lines.

In accordance with a further aspect of the technique, an image analysis system is provided which includes a processor-based system configured to access a set of image data representative of an imaging volume. The processor-based system is further configured to analyze the set of image data and to identify one or more partition lines in the set of image data. In addition, the processor-based system is configured to partition the imaging volume into sub-volumes as determined by the one or more partition lines.

In accordance with an additional aspect of the technique, a medical imaging system is provided which includes an X-ray source configured to emit a stream of radiation and a detector array configured to detect the stream of radiation. The system also includes a system controller comprising an X-ray controller, a motor controller, and a data acquisition system, wherein the system controller controls the X-ray source and receives signal data from the detector array and a computer operably connected to the system controller and to memory circuitry. An operator workstation is operably connected to the computer and at least one of a printer and a display is connected to the operator workstation. At least one of the system controller and the computer include a means for partitioning a set of image data representative of an imaging volume into one or more sub-volumes.

In accordance with a further aspect of the technique, an image analysis system is provided. The image analysis system includes a processor-based system. The processor-based system includes a means for partitioning a set of image data representative of an imaging volume into one or more sub-volumes.

In accordance with an additional aspect of the technique, a tangible medium is provided for analyzing a volume image data set. The tangible medium includes a routine for analyzing a set of image data for a volume and a routine for identifying one or more partition lines in the set of image data. Each partition line separates two sub-volumes within the volume. The tangible medium also includes a routine for partitioning the volume into sub-volumes as determined by the one or more partition lines.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
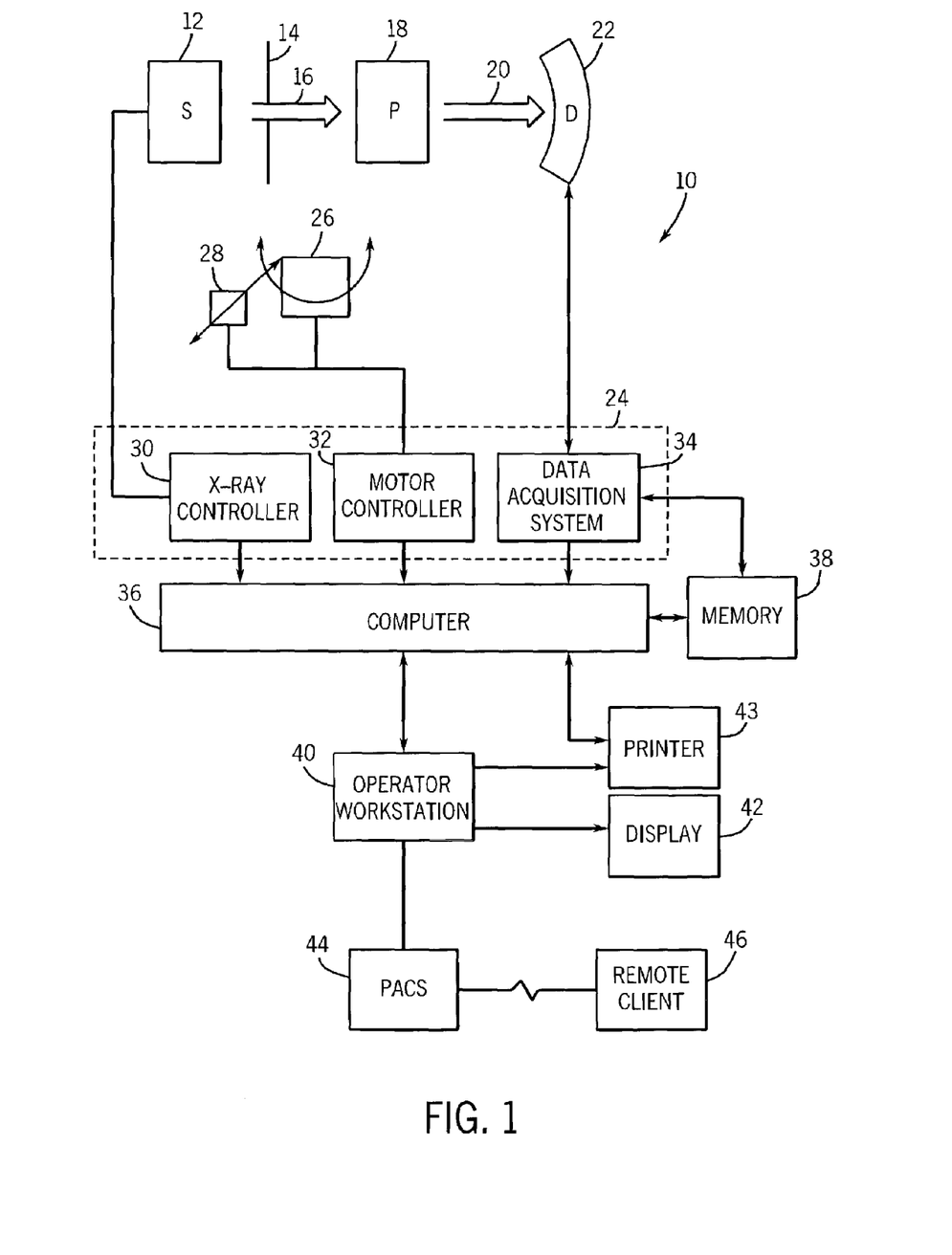
FIG. 1 is a diagrammatical view of an exemplary imaging system in the form of a CT imaging system for use in producing processed images in accordance with aspects of the present technique.

FIG. 1 illustrates diagrammatically an imaging system 10 for acquiring and processing image data. In the illustrated embodiment, system 10 is a computed tomography (CT) system designed both to acquire original image data and to process the image data for display and analysis in accordance with the present technique. Other imaging modalities which acquire image data for a volume, such as magnetic resonance imaging (MRI) or positron emission tomography (PET), may also benefit from the present techniques. The following discussion of CT systems is merely an example of one such implementation and is not intended to be limiting in terms of modality or anatomy.

In the embodiment illustrated in FIG. 1, imaging system 10 includes a source of X-ray radiation 12 positioned adjacent to a collimator 14. In this exemplary embodiment, the source of X-ray radiation source 12 is typically an X-ray tube. Collimator 14 permits a stream of radiation 16 to pass into a region in which a subject, such as a human patient 18 is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

Source 12 is controlled by a system controller 24 which furnishes both power and control signals for CT examination sequences. Moreover, detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, system controller 24 is coupled to a rotational subsystem 26 and linear positioning subsystem 28. The rotational subsystem 26 enables the X-ray source 12, collimator 14 and the detector 22 to be rotated one or multiple turns around the patient 18. It should be noted that the rotational subsystem 26 may include a gantry. Thus, the system controller 24 may be utilized to operate the gantry. The linear positioning subsystem 28 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 26 and the linear positioning subsystem 28.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 is typically coupled to the system controller 24. The data collected by the data acquisition system 34 may be transmitted to the computer 36 and moreover, to a memory 38. It should be understood that any type of memory to store a large amount of data may be utilized by such an exemplary system 10. Also the computer 36 is configured to receive commands and scanning parameters from an operator via an operator workstation 40 typically equipped with a keyboard and other input devices. An operator may control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image and to control imaging. Additionally, the scanned image may also be printed on to a printer 43 which may be coupled to the computer 36 and the operator workstation 40. Further, the operator workstation 40 may also be coupled to a picture archiving and communications system (PACS) 44. It should be noted that PACS 44 may be coupled to a remote system 46, radiology department information system (RIS), hospital information system (HIS) or to an internal or external network, so that others at different locations may gain access to the image and to the image data.

It should be further noted that the computer 36 and operator workstation 46 may be coupled to other output devices which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
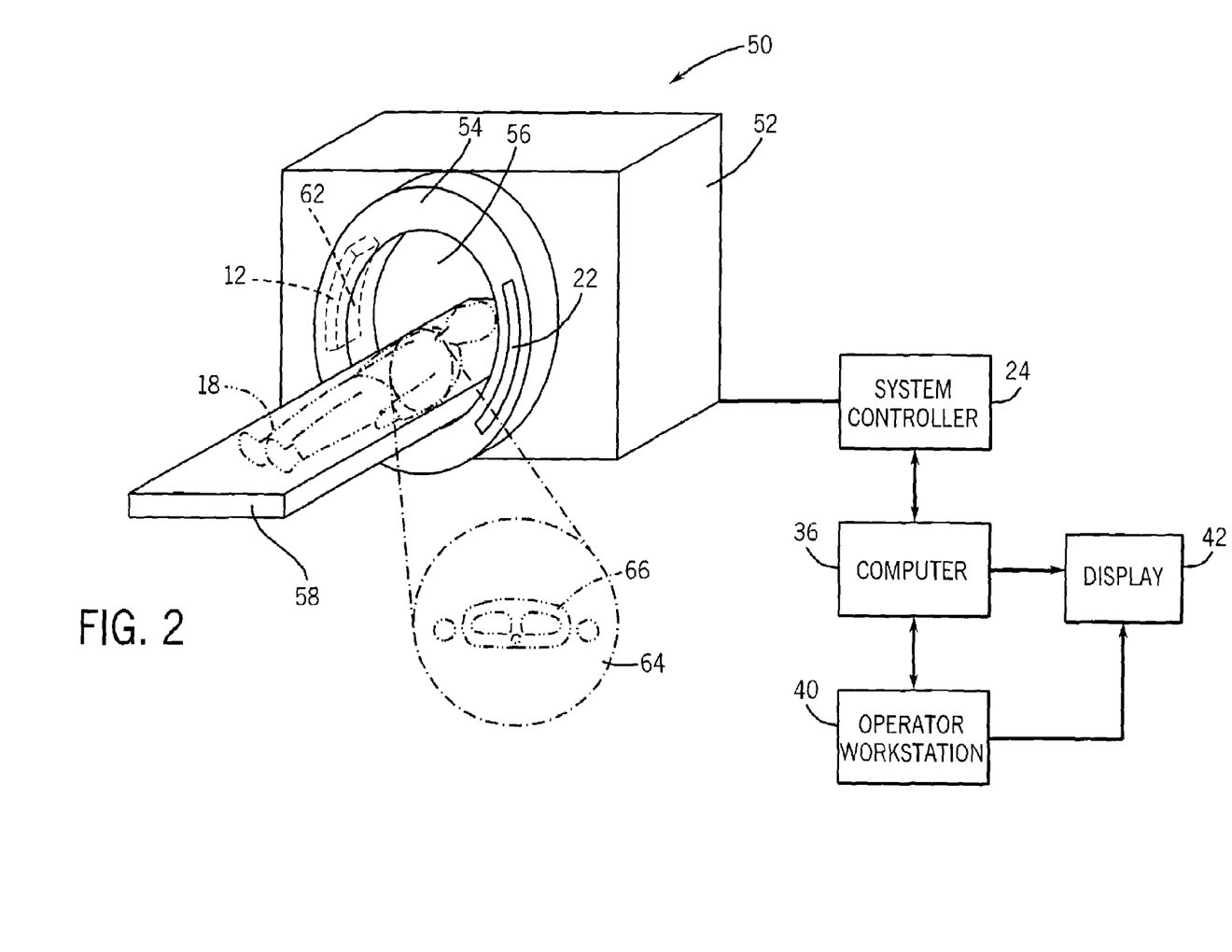
FIG. 2 is another diagrammatical view of a physical implementation of the CT system of FIG. 1.

Referring generally to FIG. 2, an exemplary imaging system utilized in a present embodiment may be a CT scanning system 50. The CT scanning system 50 is illustrated with a frame 52 and a gantry 54 that has an aperture 56. The aperture 56 may typically be 60 cm to 70 cm in diameter. Further, a patient table 58 is illustrated positioned in the aperture 56 of the frame 52 and the gantry 54. The patient table 58 is adapted so that a patient 18 may recline comfortably during the examination process. Additionally, the patient table 58 is configured to be displaced linearly by the linear positioning subsystem 28 (see FIG. 1). The gantry 54 is illustrated with the source of radiation 12, typically an X-ray tube, which emits X-ray radiation from a focal point 62. The stream of radiation is directed towards a particular region of the patient 18. It should be noted that the particular region of the patient 18 is typically chosen by an operator so that the most useful scan of a region may be acquired.

In typical operation, X-ray source 12 projects an X-ray beam from the focal point 62 and toward detector array 22. The detector 22 is generally formed by a plurality of detector elements which sense the X-rays that pass through and around a subject of interest, such as particular body parts, for instance the liver, pancreas and so on. Each detector element produces an electrical signal that represents the intensity of the X-ray beam at the position of the element at the time the beam strikes the detector. Furthermore, the gantry 54 is rotated around the subject of interest so that a plurality of radiographic views may be collected by the computer 36. Thus, an image or slice is acquired which may incorporate, in certain modes, less or more than 360 degrees of projection, to formulate an image. The image is collimated to a desired thickness, typically between 0.5 mm and 10 mm using either lead shutters in front of the X-ray source 12 and different detector apertures 22. The collimator 14 (see FIG. 1) typically defines the size and shape of the X-ray beam that emerges from the X-ray source 12.

Thus, as the X-ray source 12 and the detector 22 rotate, the detector 22 collects data of the attenuated X-ray beams. Data collected from the detector 22 then undergoes pre-processing and calibration to condition the data to represent the line integrals of the attenuation coefficients of the scanned objects. The processed data, commonly called projections, are then filtered and backprojected to formulate an image of the scanned area. As mentioned above, the computer 36 is typically used to control the entire CT system 10. The main computer that controls the operation of the system may be adapted to control features enabled by the system controller 24. Further, the operator workstation 40 is coupled to the computer 36 as well as to a display, so that the reconstructed image may be viewed.

Once reconstructed, the image produced by the system of FIGS. 1 and 2 reveals internal features of a patient. As illustrated generally in FIG. 2, an image slice 64 of the reconstructed volume or the reconstructed volume itself may be displayed to show these features, such as indicated at reference numeral 66 in FIG. 2. In diagnosing medical conditions, such as disease states, and more generally of medical events, a radiologist or physician may consider a hard copy of display of the image 64 to discern characteristic features of interest. Such features might include lesions, sizes and shapes of particular anatomies or organs, and other features which would be discernable in the image based upon the skill and knowledge of the individual practitioner.

Other analyses may be based upon capabilities of various CAD algorithms. As will be appreciated by those skilled in the art, CAD algorithms may offer the potential for identifying, or at least localizing, certain features of interest, such as anatomical anomalies. Subsequent processing and data acquisition may then be determined at the discretion of and based upon the expertise of the practitioner.

The particular CAD algorithm is commonly selected based upon the type of feature to be identified and upon the imaging modality used to create the image data. In particular, in medical imaging it is often desirable to selectively enhance certain features of the image while suppressing others. To accomplish this function, the CAD technique may employ segmentation algorithms, which selectively extract a feature from its background. The segmentation algorithm may identify the features of interest by reference to known or anticipated image characteristics, such as edges, identifiable structures, boundaries, changes or transitions in colors or intensities, changes or transitions in spectrographic information, and so forth. The complex anatomy of the human body, however, may pose a problem to the effective implementation of automatic segmentation.

For example, in both CT angiography (CTA) and magnetic resonance imaging (MRI) the feature of interest may blend in with the background. In CTA this may occur when a contrast agent is introduced into the targeted blood vessels, causing the blood vessel intensity to overlap with the intensity of nearby regions of bone. Likewise, in MRI, the contrast methodology chosen determines the intensity separation of a lesion from the surrounding structures, such as the white matter of the brain.

Additional complexity may be introduced when the feature of interest is close to another object, touches another object, or passes through the other object. This may occur, for example, in CTA where a contrast-enhanced vessel is adjacent to or passes through a region of bone. Due to the limited resolution of detector arrays, the region between the feature of interest and the other object may appear to be bridged, i.e., the feature and object may appear to be connected. In particular, partial volume averaging effects make the boundaries of the feature and object fuzzy, causing the objects to merge together in the reconstructed image. As a result of these anatomical complexities, limited detector resolution, and the anatomical variability between patients, segmentation algorithms designed for the human body in general or for large portions of the human body may fail or perform poorly in specific or localized anatomical regions.

One approach to these problems is to employ a segmentation algorithm optimized for the specific region of interest. However, use of such optimized algorithms may only be practical when the variability of the anatomical landscape is minimized, i.e., in substantially homogeneous or localized regions. To minimize anatomical variability, the imaging volume may be partitioned into anatomically distinct sub-volumes such that the bone and vessel anatomy is relatively well-defined and consistent within each sub-volume. Such partitioning would allow the development and use of segmentation algorithms optimized for each sub-volume. The partitions for the sub-volumes may be positioned by locating substantial changes in the anatomic landscape indicative of different or distinct anatomical regions.

One example of where such a partitioning technique may be beneficial is in CTA imaging of the head and neck where it is desirable to mask bone from the final image to allow visualization of the vascular structures. Unfortunately, in the head and neck region, bone blends into the anatomical background due to partial volume averaging and due to thin cross sections. In addition, other objects, such as vessels, come into contact with and pass through the cranial bones. These complexities of the head and neck region may substantially impede the automatic segmentation of bone.

The head and neck region, however, may be partitioned into three distinct sub-volumes, each with their own distinctive anatomical landscape. These sub-volumes include an inferior partition (IP) in which the arteries are circular in cross-section but touch or pass through the bone, a middle partition (MP) in which the vessels loop through the circle of Willis, and a superior partition (SP) in which the vessels branch to the different regions of the brain. The IP, in general, includes the vertebra and may include the jaw region as well. The MP corresponds to a thin, hollow shell of skull. The SP corresponds to the region in which the hollow shell of the skull begins receding to form the skull cap.

As discussed in greater detail below, the bone profile of the skull may be used as an energy indicator of the anatomical landscape and may be analyzed to determine the transition points between partitions. While the example of a head and neck region is discussed below, the techniques described are applicable to any body region possessing distinct anatomical landscapes. In particular, while the particular anatomical regions and transition points may differ, such transition points are generally detectable by the techniques discussed using a representative energy indicator or similar profile for the desired region.

Figure 3:
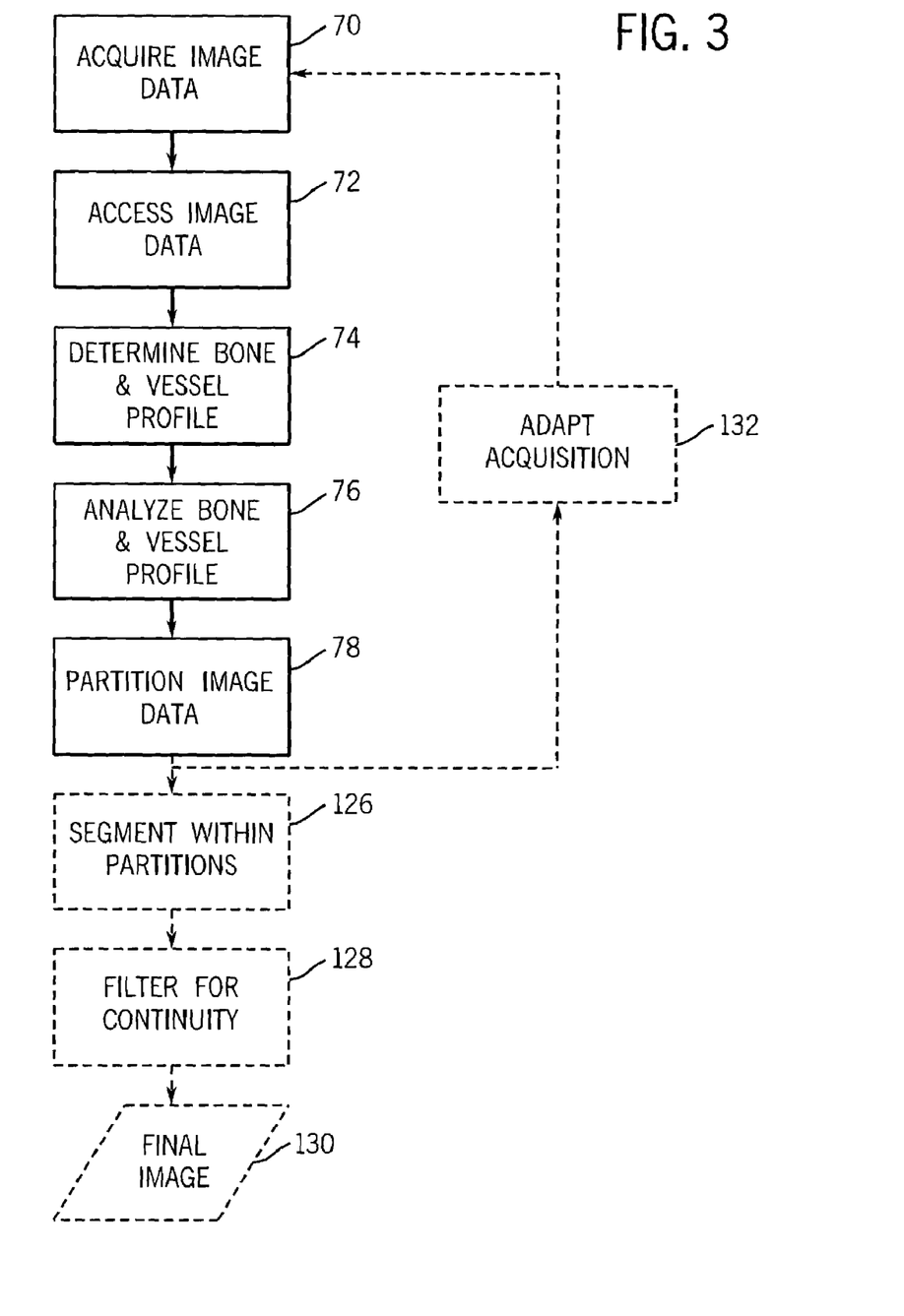
FIG. 3 is a flowchart depicting one embodiment of the present technique.

Referring now to FIG. 3, the example of the technique as it may be applied to the head and neck region is discussed in greater detail. In one exemplary embodiment, the CT imaging system 10 acquires CTA image data in the form of reconstructed axial slices 64 or images, as depicted as step 70. The reconstructed slices 64 are typically formatted in the Digital Imaging and Communications In Medicine (DICOM) standard and may be immediately processed or stored in memory 38 or at some other location, such as PACS 44 or remote client 46, until ready for processing.

In this embodiment, the acquired image data are accessed, as indicated at step 72, when ready for processing by a processor-based system, such as the system controller 24 or computer 36. The accessed image data are first analyzed to sort the images from neck to head utilizing slice location field of the slice header information to. The sorted image slices are then analyzed to determine a bone and vessel profile for the image volume, as indicated at step 74. The intensity profile of bone and vessels is then mapped to the anatomical landscape and analyzed, as indicated at step 76, to identify the slices that form the partition lines which mark the transitions between partitions. Once the partition lines are determined, the image data may be partitioned, as depicted at step 78 for further processing.

In one embodiment, the step of determining the bone and vessel profile 74 includes consolidating the bone and contrast-enhanced vessel regions into a single pixel count parameter for each slice within the imaged volume. The bone and vessel pixels can be identified due to their greater intensity relative to other structures within the CTA slices. For example identification may be performed by selecting a threshold and classifying all pixels with equal or greater intensity as bone or vessel and all pixels of less intensity as soft tissue. The threshold may be empirically selected by analyzing the intensity distribution and determining a threshold, such as 96 Hounsfeld Units (HU), which safely separates bone and vessel from soft tissue and other structures.

Figure 4:
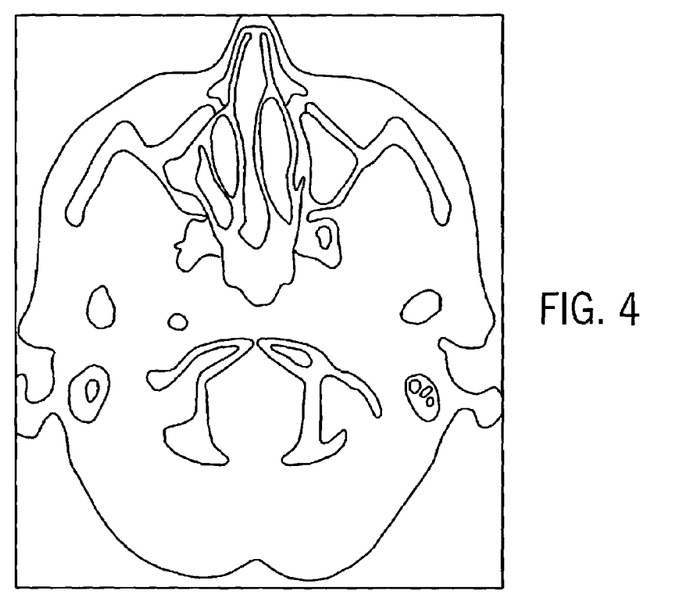
FIG. 4 is a line drawing of an axial slice depicting a head prior to soft tissue exclusion.
Figure 5:
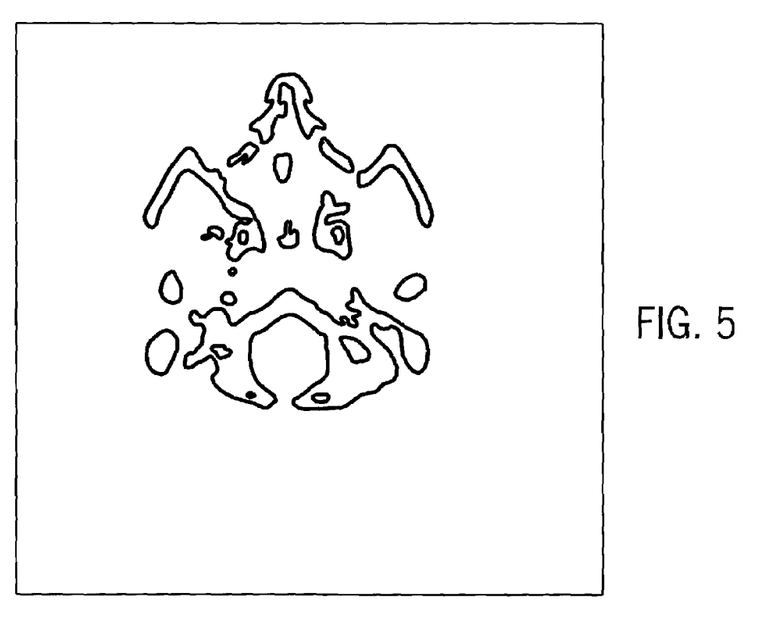
FIG. 5 is a line drawing of an axial slice depicting a head with the soft tissue excluded.

The pixel count profile of the volume is then analyzed at step 76 in a rule-based hierarchical manner to identify the inferior partition line (IPL) and the superior partition line (SPL). In one possible implementation, three layers are used to progressively measure the profile of bone and vessel with a low index and a high index being computed for each layer. The first layer may consist of the bone and vessels within each slice. To determine the first layer, an intensity threshold of 96 HU may be applied to the slices to remove soft tissue and any other structures with an intensity less than the threshold. For example, referring to FIGS. 4 & 5, FIG. 4 depicts an image slice prior to threshold exclusion of soft tissue. FIG. 5 depicts an image slice subsequent to removal of soft tissue using a threshold of 96 HU in which only bone and contrast-enhanced vessels remain. For each slice, the number of remaining pixels, i.e., the number of bone and vessel pixels, are counted and stored within an array, hereinafter the primary array.

The second layer may be generated by computing a bounding box for each slice after removal of the soft tissue and other structure pixels using a suitable threshold, as discussed above. The bounding box may be generated by scanning each slice in a raster fashion and recording the location of the first bone or vessel pixel encountered. The scan is then repeated in the reverse direction and the first bone or vessel pixel at the other end of the image is recorded. The two pixel locations may then be used to split the image into a top and bottom box. For each slice, the bone and vessel pixel count from the top box is stored in a second data array, hereinafter the box array.

Figure 6:
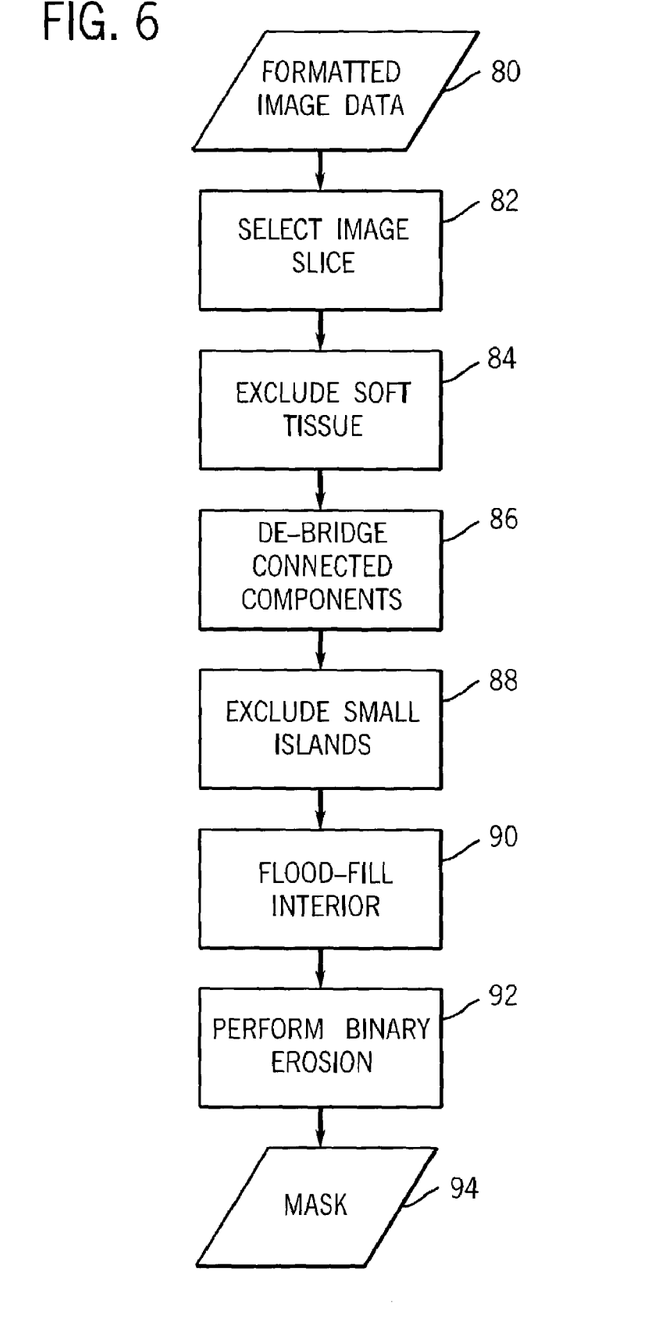
FIG. 6 is a flowchart depicting one technique for generating a mask for determining interior bone and vessel regions.

The third layer may consist of the bone and vessel pixels lying in the interior of the image. The interior bone and vessel pixels are counted and the count is stored within a third data array, hereinafter the interior array. In one embodiment, a single slice, such as a cranial slice, is analyzed to obtain a binary mask, thereby defining an internal area in which pixels are counted. In this embodiment, the interior area of interest of each slice is identified using the binary mask. One technique by which a binary mask can be created is depicted in FIG. 6. As depicted, a slice is selected from the formatted image data 80, represented at step 82. At step 84, the soft tissue and other structures are excluded from the selected slice by using a suitable threshold, as discussed above. Excluded pixels are given a value of 0, while those remaining pixels are given a value of 1.

In the resulting soft-tissue excluded image data, regions of bone and vessel may appear to be connected, or "bridged," due to their proximity and to the limited resolution of the detector 22. These apparent connections are excluded, as depicted at step 86, by application of a de-bridging algorithm which may function by shrinking or otherwise reducing the periphery of each structure until the apparent connections are destroyed.

After the soft tissue exclusion and de-bridging steps, small islands of bone and muscle may be present in the slice, generally due to the operation of the de-bridging algorithm. The small islands are excluded, as depicted at step 88, in order to retain the largest regions possible for further processing. In addition, as a result of the preceding steps, small holes or voids may be present in the bone regions of the slice. In particular, these holes may result where there are regions of traebecular bone, which is less dense than cortical bone and therefore produce less intensity in the original slice pixels. Nevertheless, these gaps or voids may represent regions of bone which have incidentally been excluded by the preceding steps. To correct this incidental exclusion, the interior regions of bone and vessel may be flood-filled, as represented at step 90, such that the interior hole or void pixels are given a value of 1, as in surrounding bone and vessel region.

One or more binary erosions are then performed on the flood-filled bone and vessel image, as represented at step 92. The binary erosions exclude the exterior portions of the bone and vessel regions, leaving a binary mask 94 consisting of the interior portions of the bone and vessel regions. Because the mask 94 consists of the interior portions of the blood and vessel regions, there is a high probability that the pixels included in the mask 94 are indeed associated with bone and vessel and are not in fact regions of adjacent tissue which have been incidentally selected.

Once created, the mask 94 is used to determine an interior bone count for each slice. The binary mask 94 is applied to each slice from the volume data set. Where bone pixels in the image slice, i.e., those pixels having an intensity equal to or greater than 96 HU, correspond to a pixel in the binary mask having a value of 1, the bone pixel is counted and the count for each slice is stored in a third data array, hereinafter the interior array.

Figure 7:
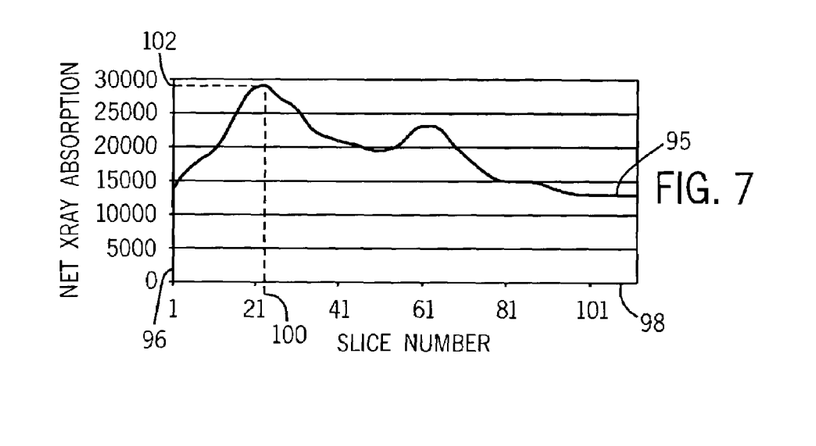
FIG. 7 is an exemplary bone profile generated for a head and neck region.

In the presently described implementation, the primary array, box array, and interior array each contain a slice-by-slice pixel count derived by the three hierarchical methods noted above. Each pixel count represents a bone profile 95 across the volume, as depicted in FIG. 7. In FIG. 7, net X-ray absorption, i.e. the pixel or bone count, is depicted along the vertical axis 96 while slice number is depicted along the horizontal axis 98. Slice 1 corresponds to an axial slice in the region of the neck, i.e. the base of the skull, while the highest number slices correspond to the top of the head.

Figure 8:
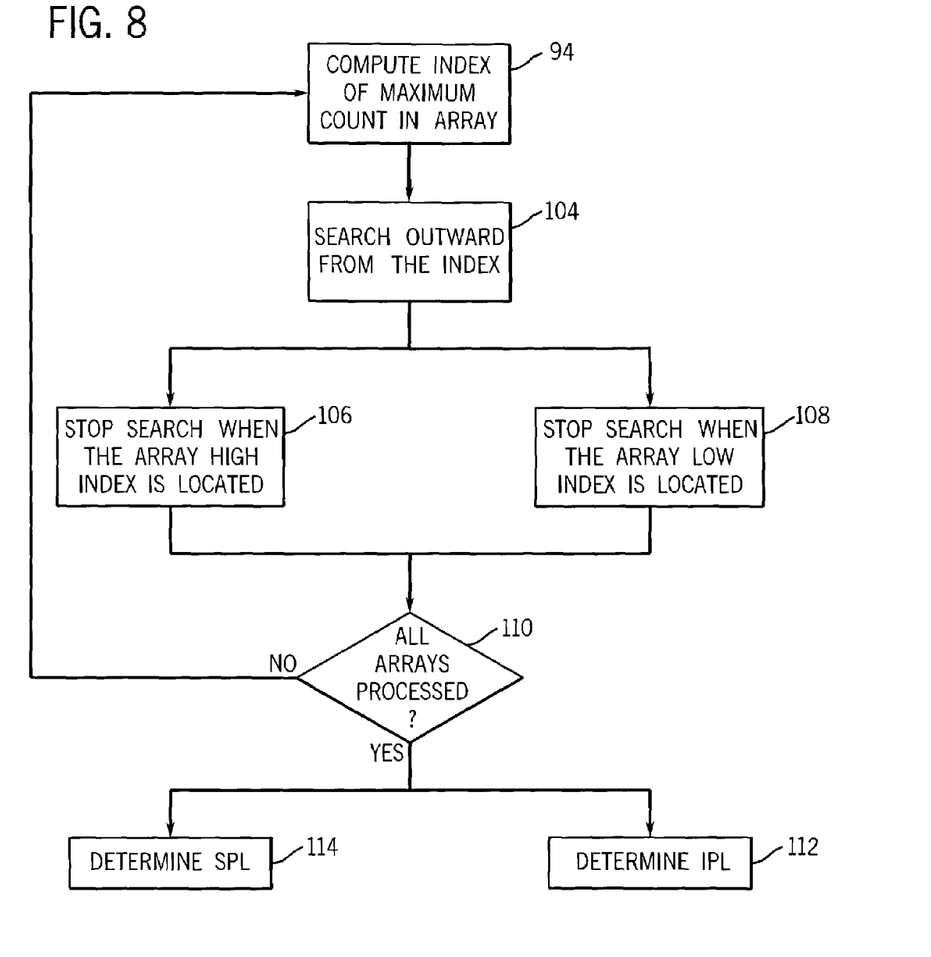
FIG. 8 is a flowchart depicting one technique for identifying partition lines.

After computation of the three arrays, the partition lines may be computed using a rule-based hierarchical search of the corresponding bone profiles 95, as depicted in FIG. 8. The partition lines correspond to the locations of substantial anatomical change, as noted above. From each of the three profiles 95 the index, i.e. the slice, corresponding to the maximum pixel count is determined and stored along with the maximum pixel count, as depicted at step 99. By way of example, the index is depicted by reference numeral 100 in FIG. 7 while the maximum pixel count is depicted by reference numeral 102. A low index search and a high index search are then conducted in either direction from the index location of the array, as depicted by step 104. The low index search is initialized to −1 while the high index search is initialized to 1. The low index corresponds to the IPL for that profile while the high index corresponds to the SPL. The searches continue until stopped, as depicted at steps 106 and 108, in accordance with a set of hierarchical rules determining the locations of the low and high indexes respectively. While the searches may be fully automated in one embodiment, in another embodiment the searches are supervised by a human agent, such as a radiologist or physician. In the embodiment where the search process is supervised, the search algorithm may be trained in response to the supervision, i.e. the search algorithm may be programmed to adapt in response to decisions made by the human agent.

By means of example, the application of the hierarchical rules for location of the low index, and therefore stopping the search as depicted at step 108, may include calculating the following conditions:

(1) array count [low index]<(0.9)(array count [max count index]) &&
(2) array count [low index+1]>(0.9)(array count [max count index]);
(3) if (1) and (2) are true, is max count index−low index <10;
(4) if (1) and (2) are true but (3) is false, lower index= (max count index−10); and
(5) if lower index is 0 and (1) and (2) are false, low index=1.

The rules are applied to each array, as noted by decision block 110, such that a low index is determined for each array.

Once the low index is determined for each array using the above hierarchical rules, the three indices are combined using a set of rules to determine the IPL, as depicted at step 112. An exemplary set of rules might include:

(A) if (1), (2), and (3) are true for the primary array, IPL=primary low index;
(B) if (1), (2), and (3) are false for the primary array but true for the box array, IPL=box low index;
(C) if (1), (2), and (3) are false for the primary array but either rule (4) or (5) are true for the primary array, IPL=primary low index;
(D) if (1), (2), (3), (4), and (5) are false for the primary array and (1), (2), and (3) are false for the box array but (4) and (5) are true for the box array, IPL=box low index; and
(E) if (1), (2), (3), (4), and (5) are false for the primary array and are false for the box array but (1), (2), and (3) are true for the interior array, IPL=interior low index.

The high index may be similarly determined for each array, as depicted at step 106, to determine the SPL. For example, to determine the high array for each index, conditions such as the following may be calculated:

(1) array count [high index]<(0.7)(array count [max count index]) &&
(2) array count [high index−1]>(0.7)(array count [max count index]);
(3) if (1) and (2) are true, is 35<(high index−max count index)<60;
(4) array count [high index]>(0.7)(array count [max count index]) &&

(5) array count [high index−1]>(0.7)(array count [max count index]);

(6) if (4) and (5) are true, is 35<(high index−max count index)<60;

(7) if (1) and (2) are true but (3) is false, then high index=(max count index+45);

(8) if (4) and (5) are true but (6) is false, then high index=(max count index+45); and (9) if end of volume and (1), (2), (4), and (5) are false, then high index=(max count index+45).

Once the high index is determined for each array using the above or similar hierarchical rules, the three indices are combined using a set of rules to determine the SPL, as depicted at step 114. An exemplary set of rules might include:

(A) if (1), (2), (3), (4), (5), and (6) are true for the primary array and for the box array, SPL=(primary high index+box high index)/2;

(B) if rules (1), (2), and (3) are true for the primary array but are false for the box array, SPL=primary high index;

(C) if rules (1), (2), and (3) are false for the primary array but are true for the box array, SPL=box high index;

(D) if (1), (2), and (3) are false for the primary array and for the box array but are true for the interior array, SPL=interior high index; and (E) if (1), (2), and (3) are false for the primary array and for the box array but (7), (8), and (9) are true for the primary array, SPL=primary high index.

Other sets of rules and conditions are of course possible and may be determined empirically.

Figure 9:
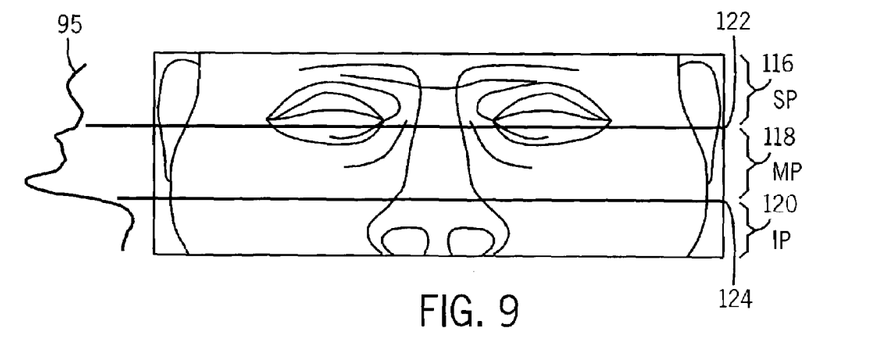
FIG. 9 is a coronal view of a head with partition lines subdividing the head into three sub-volumes in accordance with an exemplary bone profile.
Figure 10:
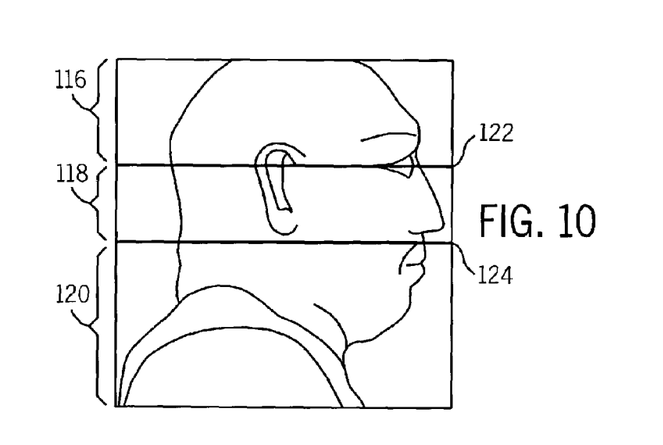
FIG. 10 is a sagital view of the head of FIG. 9 with partition lines subdividing the head into three sub-volumes.

Once the IPL and SPL have been determined, the imaged volume, here a patient head, may be partitioned into sub-volumes for optimized processing, as depicted in FIGS. 9 and 10. FIG. 9 presents a coronal view of a patient head sub-divided into three sub-volumes, the SP 116, the MP 118, and the IP 120 by the respective partition lines SPL 122 and IPL 124. FIG. 9 also includes a bone profile 95 which depicts the partition lines 122, 124 in terms of their respective index locations along the profile 95. FIG. 10 presents similar information from a sagital perspective. While the partition lines of FIGS. 9 and 10 have been depicted as simple lines or planes for simplicity, the three-dimensional nature of the data allows for the partition 122, 124 to be three-dimensional as well. In particular, the acquired data can be accessed and processed in view of the coronal and/or sagital relationships in addition to the axial data to develop a more complex three-dimensional partition for generating sub-volumes.

Once the partition lines 122, 124 are determined, the respective sub-volumes 116, 118, 120 may be further processed by algorithms optimized for anatomical landscape within each sub-volume 116, 118, 120. Referring once again to FIG. 3, this optimized processing may include an optimized segmentation step 126, or an optimized filtration step 128 prior to rendering a final processed image 130. The optimized filtration step 128 may include routines for analyzing or enhancing continuity at the partition lines 122, 124 which may be poor due to differential processing.

In addition, as depicted in FIG. 3, the determination of the partition lines 122, 124 can also be applied to the scout data of a CT scan to adapt the subsequent acquisition of volume image data, as depicted by step 132. In a present implementation, the scout data is a non-volumetric data set, such as a single sagital or coronal view, collected prior to the acquisition of the primary, volumetric data which can be used to calculate dosage and to set acquisition parameters. In addition, the scout data may be used to preview the anatomical landscape in the volume of interest to determine appropriate sub-volumes partitions. The scout data can thereby be used to optimize slice volume and thickness, which are generally fixed for the entire volume, within the sub-volumes during the volumetric data acquisition sequence.

By varying the slice thickness and resolution within sub-volumes, the amount of data collected, the dose delivered to the patient, and the scan time can be optimized. For example, a full-body CTA scan using 1 mm slices will create approximately 1500 slices. However some sections of the body, such as the femur and the tibia/fibula, exhibit little anatomical variation and could be scanned at a larger slice thickness, such as 3 mm, without substantial loss of information. By analyzing and partitioning based upon the scout data, these partitions can be defined appropriately.

In addition, partitioning done at the scout level also allows the partitioning of challenging regions, such as where metal implants are present. Such regions, once isolated, may require different scanning parameters and reconstruction methods to avoid artifacts and to improve image quality. Partitioning of the scout data can be implemented as a feedback loop, allowing customized acquisition of slices within each sub-volume.

In one embodiment, the partition process, whether employed on a scout image or a volumetric acquisition, may be fully automated. In another embodiment, the partition process may be supervised by a human agent such that the partition algorithm is trained in response to the decisions of the human agent. Likewise, the process can be extended to other body regions than the head and neck including the abdomen, pelvis and extremities. This extension can be accomplished by defining an appropriate energy profile to describe the respective anatomical landscape to be partitioned and by defining appropriate rules to be used in conjunction the energy profile. Slice location information included in the formatted slice header may determine which rules are applicable for a given slice.

In addition, as noted earlier, the technique can be applied to other imaging modalities, such as MRI or PET, since segmentation problems associated with anatomical variation are common to the various imaging modalities. Due to these anatomical complications, other imaging modalities also may benefit from the technique of partitioning regions of anatomic distinctiveness and optimizing acquisition and processing within these partitions. In MRI, for example, soft tissue voxels, as opposed to bone and vessel voxels, can be determined and used to form a profile which can then be used to partition the desired sub-volumes for optimized acquisition and processing.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for processing volume image data, comprising:

identifying one or more partition lines in a set of image data, wherein each partition line separates two sub-volumes within a volume;

partitioning the volume into sub-volumes as determined by the one or more partition lines; and
differentially segmenting each sub-volume.

2. The method as recited in claim 1, further comprising analyzing the set of image data to determine one or more energy profiles for the set of image data.

3. The method as recited in claim 2, wherein the one or more energy profiles are one or more bone profiles.

4. The method as recited in claim 2, wherein identifying one or more partition lines comprises analyzing the one or more energy profiles using one or more sets of rules.

5. The method as recited in claim 4, wherein the one or more sets of rules are configured to identify anatomic transition regions within the set of image data.

6. The method as recited in claim 4, wherein the one or more sets of rules are configured to each identify an index within a respective energy profile and wherein the indices are analyzed by a second set of rules to identify a respective partition line.

7. The method as recited in claim 1, wherein identifying one or more partition lines comprises training an algorithm to identify the one or more partition lines in response to one or more decisions by a human agent.

8. The method as recited in claim 1, wherein differentially segmenting each sub-volume comprises applying a customized segmentation algorithm to each sub-volume.

9. The method as recited in claim 1, wherein the set of image data is a set of scout data.

10. The method as recited in claim 9, further comprising accessing the set of scout data.

11. The method as recited in claim 10, further comprising acquiring the set of scout data.

12. The method as recited in claim 10, further comprising adapting an acquisition of volumetric data such that each sub-volume is differentially acquired.

13. The method as recited in claim 12, wherein adapting the acquisition of volumetric data comprises customizing at least one of a thickness and a resolution of a plurality of slices within a sub-volume.

14. The method as recited in claim 1, wherein analyzing the set of image data comprises determining one or more soft tissue profiles for the set of image data.

15. The method as recited in claim 14, wherein identifying one or more partition lines comprises analyzing the one or more soft tissue profiles using one or more sets of rules.

16. The method as recited in claim 15, wherein the one or more sets of rules are configured to identify anatomic transition regions within the set of image data.

17. A medical imaging system, comprising:
an X-ray source configured to emit a stream of radiation;
a detector array configured to detect the stream of radiation;
a system controller comprising an X-ray controller, a motor controller, and a data acquisition system, wherein the system controller controls the X-ray source and receives signal data from the detector array;
a computer operably connected to the system controller and to memory circuitry;
an operator workstation operably connected to the computer; and
at least one of a printer or a display connected to the operator workstation; wherein at least one of the system controller or the computer is configured to identify one or more partition lines in a set of image data, to partition the imaging volume into sub-volumes as determined by the one or more partition lines, and to differentially segment each sub-volume.

18. The medical imaging system as recited in claim 17, wherein at least one of the system controller or the computer analyzes the set of image data by at least determining one or more bane profiles for the set of image data.

19. The medical imaging system as recited in claim 18, wherein at least one of the system controller or the computer identifies one or more partition lines by at least analyzing the one or more bone profiles using one or more sets of rules.

20. The medical imaging system as recited in claim 19, wherein the one or more sets of rules are configured to identity anatomic transition regions within the set of image data.

21. The medical imaging system as recited in claim 19, wherein the one or more sets of rules are configured to each identity an index within a respective bone profile and wherein the indices are analyzed by a second set of rules to identity a respective partition line.

22. The medical imaging system as recited in claim 17, wherein at least one of the system controller or the computer differentially segments each sub-volume by at least applying a customized segmentation algorithm to each sub-volume.

23. The medical imaging system as recited in claim 17, wherein at least one of the system controller or the computer is further configured to access the set of image data, wherein the set of image data is a set of scout data.

24. The medical imaging system as recited in claim 23, wherein at least One of the system controller or the computer is further configured to acquire the set of image data.

25. The medical imaging system as recited in claim 24, wherein at least one of the system controller or the computer is further configured to adapt the acquisition of volumetric data such that each sub-volume is differentially acquired.

26. The medical imaging system as recited in claim 25, wherein at least one of the system controller or the computer adapts the acquisition of volumetric data by customizing at least one of a thickness and a resolution of a plurality of slices within a sub-volume.

27. The medical imaging system as recited in claim 17, wherein at least one of the system controller or the computer analyzes the set of image data by at least determining one or more soft tissue profiles for the set of image data.

28. The medical imaging system as recited in claim 27, wherein at least one of the system controller or the computer identifies one or more partition lines by at least analyzing the one or more soft tissue profiles using one or more sets of rules.

29. The medical imaging system as recited in claim 28, wherein the one or more sets of rules are configured to identify anatomic transition regions within the set of image data.

30. An image analysis system for analyzing volume image data, comprising:
a processor-based system configured to access a set of image data representative of an imaging volume, to analyze the set of image data, to identify one or more partition lines in the set of image data, to partition the imaging volume into sub-volumes as determined by the one or more partition lines, and to differentially segment each sub-volume.

31. The image analysis system as recited in claim 30, wherein the processor-based system analyzes the set of image data by at least determining one or more bone profiles for the set of image data.

32. The image analysis system as recited in claim 31, wherein the processor-based system identifies one or more partition lines by at least analyzing the one or more bone profiles using one or more sets of rules.

33. The image analysis system as recited in claim 32, wherein the one or more sets of rules are configured to identify anatomic transition regions within the set of image data.

34. The image analysis system as recited in claim 32, wherein the one or more sets of rules are configured to each identify an index within a respective bone profile and wherein the indices are analyzed by a second set of rules to identify a respective partition line.

35. The image analysis system as recited in claim 30, wherein the processor-based system differentially segments each sub-volume by at least applying a customized segmentation algorithm to each sub-volume.

36. The image analysis system as recited in claim 30, wherein the processor-based system is further configured to acquire the set of image data.

37. The image analysis system as recited in claim 36, wherein the processor-based system is further configured to adapt the acquisition of data such that each sub-volume is differentially acquired.

38. The image analysis system as recited in claim 37, wherein the processor-based system adapts the acquisition of data by customizing at least one of a thickness and a resolution of a plurality of slices within a sub-volume.

39. The image analysis system as recited in claim 30, wherein the processor-based system analyzes the set of image data by at least determining one or more soft tissue profiles for the set of image data.

40. The image analysis system as recited in claim 39, wherein the processor-based system identifies one or more partition lines by at least analyzing the one or more soft tissue profiles using one or more sets of rules.

41. The image analysis system as recited in claim 40, wherein the one or more sets of rules are configured to identify anatomic transition regions within the set of image data.

42. A computer-readable medium encoded with a computer program for processing an image data set, comprising:
   a routine for identifying one or more partition lines in the set of image data, wherein each partition line separates two sub-volumes within a volume;
   a routine for partitioning the volume into sub-volumes as determined by the one or more partition lines; and
   a routine for differentially segmenting each sub-volume.

43. The computer-readable medium as recited in claim 42, further comprising a routine for training the routine for identifying one or more partition lines in the set of image data in response to one or more decisions by a human agent.

44. The computer-readable medium as recited in claim 42, wherein the routine for analyzing the set of image data determines one or more energy profiles for the set of image data.

45. The computer-readable medium as recited in claim 44, wherein the one or more energy profiles are one or more bone profiles.

46. The computer-readable medium as recited in claim 44, wherein the routine for identifying one or more partition lines analyzes the one or more energy profiles using one or more sets of rules.

47. The computer-readable medium as recited in claim 46, wherein the one or more sets of rules are configured to identify anatomic transition regions within the set of image data.

48. The computer-readable medium as recited in claim 46, wherein the one or more sets of rules are configured to each identify an index within a respective energy profile and wherein the indices are analyzed by a second set of rules to identify a respective partition line.

49. The computer-readable medium as recited in claim 42, wherein the routine for differentially segmenting each sub-volume applies a customized segmentation algorithm to each sub-volume.

50. The computer-readable medium as recited in claim 42, further comprising a routine for adapting the acquisition of the set of image data such that each sub-volume is differentially acquired.

51. The computer-readable medium as recited in claim 50, wherein the routine for adapting the acquisition data customizes at least one of a thickness and a resolution of a plurality of slices within a sub-volume.

52. The computer-readable medium as recited in claim 42, wherein the routine for analyzing the set of image data determines one or more soft tissue profiles for the set of image data.

53. The computer-readable medium as recited in claim 52, wherein the routine for identifying one or more partition lines analyzes the one or more soft tissue profiles using one or more sets of rules.

54. The computer-readable medium as recited in claim 53, wherein the one or more sets of rules are configured to identify anatomic transition regions within the set of image data.

* * * * *